United States Patent [19]
Anderson

[11] Patent Number: 5,832,416
[45] Date of Patent: Nov. 3, 1998

[54] CALIBRATION SYSTEM FOR COORDINATE MEASURING MACHINE

[75] Inventor: Paul J. Anderson, Wyoming, R.I.

[73] Assignee: Brown & Sharpe Manufacturing Company, North Kingstown, R.I.

[21] Appl. No.: 523,014

[22] Filed: Sep. 1, 1995

[51] Int. Cl.$^6$ .................................................. G01B 7/00
[52] U.S. Cl. ........................................... 702/95; 702/152
[58] Field of Search ..................... 364/474.03, 474.05, 364/474.37, 569, 560, 561, 562, 563, 571.01–571.08, 474.35; 33/502, 503; 702/94, 95, 97, 150–168

[56] References Cited

U.S. PATENT DOCUMENTS

| | | | |
|---|---|---|---|
| 3,886,666 | 6/1975 | Thompson et al. | 33/174 P |
| 4,455,755 | 6/1984 | Fritsche et al. | 33/174 L |
| 4,782,598 | 11/1988 | Guarini | 33/503 |
| 4,819,195 | 4/1989 | Bell et al. | 364/571.05 |
| 4,819,339 | 4/1989 | Kunzmann et al. | 33/503 |
| 4,884,889 | 12/1989 | Beckwith, Jr. | 356/375 |
| 4,939,678 | 7/1990 | Beckwith, Jr. | 364/571.02 |
| 4,982,504 | 1/1991 | Soderberg et al. | 33/502 |
| 5,138,563 | 8/1992 | Debitsch et al. | 364/560 |
| 5,148,377 | 9/1992 | McDonald | 364/560 |
| 5,259,120 | 11/1993 | Chapman et al. | 33/502 |
| 5,283,630 | 2/1994 | Yoshizumi | 356/376 |
| 5,579,246 | 11/1996 | Edersbach et al. | 364/571.01 |
| 5,594,668 | 1/1997 | Bernhardt et al. | 364/560 |
| 5,610,846 | 3/1997 | Trapet et la. | 364/560 |

OTHER PUBLICATIONS

K. Busch et al. "Numerical Error–Correction of a Coordinate Measuring Machine", pp. 284–288, Proceedings of the International Symposium on Metrology for Quality Control in Production, Tokyo 1984.

*Primary Examiner*—James P. Trammell
*Attorney, Agent, or Firm*—Wolf, Greenfield & Sacks, P.C.

[57] ABSTRACT

A calibration system for measuring position errors in a coordinate measuring machine having a fixed table and a movable element is provided. The system includes a straightedge assembly attachable to the table and a sensing fixture attachable to the movable element. The straightedge assembly includes a straightedge having a first reference surface that is parallel to a predetermined direction and a second reference surface perpendicular to the first reference and parallel to the predetermined direction. The sensing fixture includes a fixture housing and sensors on the housing for sensing the position of the movable element relative to the straightedge and generating position error signals representative of position errors of the movable element as the sensing fixture is moved in the predetermined direction along the straightedge. The sensors provide position error signals representative of displacement, straightness, pitch, yaw and roll errors of the movable element. Linear variable differential transformers may be used for sensing straightness, pitch, yaw and roll errors.

38 Claims, 12 Drawing Sheets ized as X, Y and Z coordinates within a working volume of the machine. To measure a distance between two points, the points are contacted successively, the coordinates of both points are read, and distance is calculated from the coordi-

CALIBRATION SYSTEM FOR COORDINATE MEASURING MACHINE

FIELD OF THE INVENTION

This invention relates to coordinate measuring machines and, more particularly, to a system, including a precision straightedge, for calibrating coordinate measuring machines to compensate for position dependent errors in measured coordinate values.

BACKGROUND OF THE INVENTION

Coordinate measuring machines are used for dimensional inspection of workpieces such as machine parts. A workpiece is typically secured to a fixed table, and a measuring probe is secured to a ram which is movable in three dimensions. To measure the position of a point on the workpiece, the probe is brought into contact with the point, and measuring scales or other sensors on the machine are read. The position of the point is typically expressed as X, Y and Z coordinates within a working volume of the machine. To measure a distance between two points, the points are contacted successively, the coordinates of both points are read, and distance is calculated from the coordinates. State of the art coordinate measuring machines typically have features such as high resolution measuring systems, electrical contact probes, motor drives, computer controlled drives and computer acquisition and processing of data.

One type of coordinate measuring machine is known as a moving bridge machine. A bridge moves in the Y direction along guideways on a table. A carriage moves in the X direction along guideways on the bridge. A ram with a probe mounted on its lower end moves vertically through bearings in the carriage, thus providing three-dimensional movement of the probe. Scales associated with each of the movable elements indicate the positions of the movable elements in three axial directions.

Another type of coordinate measuring machine includes a fixed table, a support structure and an articulated arm. A first end of the articulated arm is pivotally connected to the support structure, and a second end is movable in a horizontal plane. A Z-ram mounted to the second end of the articulated arm is vertically movable with respect to the articulated arm, thus providing three-dimensional movement. The articulated arm includes a first arm assembly pivotally connected to the support structure and a second arm assembly pivotally connected to the first arm assembly. A measuring system determines the coordinates of the probe in a machine working volume.

The accuracy of a coordinate measuring machine is limited by inaccuracies in the scales or other measuring devices, and by faults in the guideways or other elements which define machine motions. One approach to increasing accuracy is simply to improve the construction techniques and to reduce tolerances of the system so that errors are reduced. However, the reduction of errors becomes progressively more expensive as required accuracies increase. Another approach is direct measurement of coordinate errors at points throughout the machine working volume. This approach is impractical because of the huge amounts of data which must be stored for large machines and because of the time required to measure such data. A third approach is the measurement of errors in parametric form. Sets of error parameters are measured, for example, along three mutually orthogonal axes and are stored for future use. The X, Y and Z errors at any point in the measurement volume are calculated from the parametric errors. The calculated errors are then subtracted from the measured coordinate values to determine actual workpiece coordinates.

The moving bridge coordinate measuring machine has three sets of guideways which establish probe motion. Ideally, movement along each of these guideways should result only in linear motion, and the scale reading should equal the linear displacement. In reality, however, there are scale errors and the guideways are not completely straight or perfectly free from twist. For a real machine, there are six degrees of freedom which produce errors during movement along each guideway. For each direction of movement, there are three linear errors, Dx, Dy and Dz and three rotational errors, Ax, Ay and Az. The six error parameters can be measured at a number of points along each direction of machine movement, resulting in an error matrix with 18 error parameters. From the matrix of 18 error parameters, the error at any point in the measurement volume can be calculated.

Various techniques have been used in the prior art for measurement of parametric errors. Laser interferometer techniques are well known for measuring displacement errors with high accuracy. A calibration system for measuring the parametric errors in a coordinate measuring machine is disclosed in U.S. Pat. No. 4,884,889 issued Dec. 5, 1989 to Beckwith, Jr. and U.S. Pat. No. 4,939,678 issued Jul. 3, 1990 to Beckwith, Jr. The disclosed calibration system includes a reflector assembly attachable to the ram and a laser measuring assembly attachable to the table of the coordinate measuring machine. The laser measuring assembly directs a plurality of laser beams at the reflector assembly, senses laser beams reflected from the laser assembly and generates displacement, straightness, pitch, yaw, and roll error signals. A method for calibrating a coordinate measuring machine wherein calibration equipment includes a laser interferometer, electronic levels, a vertical straightedge and probe, is disclosed in U.S. Pat. No. 4,819,195 issued Apr. 4,1989 to Bell et al. All known prior art systems for calibrating coordinate measuring machines have been relatively complex and expensive. In addition, calibration procedures are lengthy, complex, expensive and subject to error.

SUMMARY OF THE INVENTION

According to the present invention, apparatus for measuring position errors in a machine having a movable element and a table is provided. The apparatus is typically used for calibrating a coordinate measuring machine. The apparatus comprises a straightedge assembly attachable to the table and a sensing fixture attachable to the movable element. The straightedge assembly includes a straightedge. The sensing fixture includes a fixture housing and sensing means on the housing for sensing the position of the movable element relative to the straightedge and for generating position error signals representative of position errors of the movable element as the sensing fixture is moved in a predetermined direction along the straightedge.

The straightedge preferably includes a first reference surface that is parallel to the predetermined direction and a second reference surface perpendicular to the first reference surface and parallel to the predetermined direction. The sensing means preferably includes a plurality of sensors for providing position error signals representative of displacement, pitch, yaw and roll errors of said movable element along the predetermined direction.

The sensing means includes first and second sensors spaced apart along the predetermined direction for sensing the position of the movable element relative to the first reference surface in a direction perpendicular to the first reference surface. The position errors provided by the first and second sensors represent pitch errors of the movable element along the predetermined direction.

The sensing means may further include third and fourth sensors spaced apart along the predetermined direction for sensing the position of the movable element relative to the second reference surface in a direction perpendicular to the second reference surface. The position errors provided by the third and fourth sensors represent yaw errors of the movable element along the predetermined direction.

The sensing means may further include a fifth sensor spaced from the third and fourth sensors perpendicular to the predetermined direction for sensing the position of the movable element relative to the second reference surface in a direction perpendicular to the second reference surface. The position error signals provided by the third, fourth and fifth sensors represent roll errors of the movable element along the predetermined direction. The first, second, third, fourth and fifth sensors may comprise linear variable differential transformers.

The straightedge assembly may include a scale mounted on the straightedge parallel to the predetermined direction. The sensing means may include a read head for sensing the scale and generating position error signals representative of displacement errors of the movable element along the predetermined direction.

Vertical and horizontal straightness errors may be determined in one of two ways. When the sensing fixture is maintained at a fixed spacing from the straightedge by a preloading mechanism, straightness errors are determined by moving the sensing fixture along the straightedge and recording the scale readings of the coordinate measuring machine. Since the straightedge has precision straightness, deviations of the scale readings are indicative of straightness errors. When the preloading mechanism is not utilized, the sensing fixture is displaced relative to the straightedge in response to the straightness errors. The first sensor provides position error signals representative of vertical straightness errors, and the third sensor provides position error signals representative of horizontal straightness errors.

The apparatus preferably includes a mounting fixture for mounting the straightedge assembly to the table in different orientations to permit measurement of position errors along different predetermined directions. The mounting fixture preferably comprises a base plate that is mounted in a fixed position on the table. The base plate has two or more sets of locating grooves, one set corresponding to each of the orientations of the straightedge assembly. The straightedge assembly has locating elements for engaging the locating grooves in each of the orientations.

The apparatus may further include means for preloading the sensing fixture against the straightedge assembly. The straightedge assembly may include first and second magnetic strips disposed parallel to the first and second reference surfaces, respectively. The sensing fixture may include one or more magnetic elements attached to the fixture housing for urging the sensing fixture toward the magnetic strips and point bearings attached to the fixture housing for maintaining a desired spacing between the fixture housing and the straightedge assembly.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
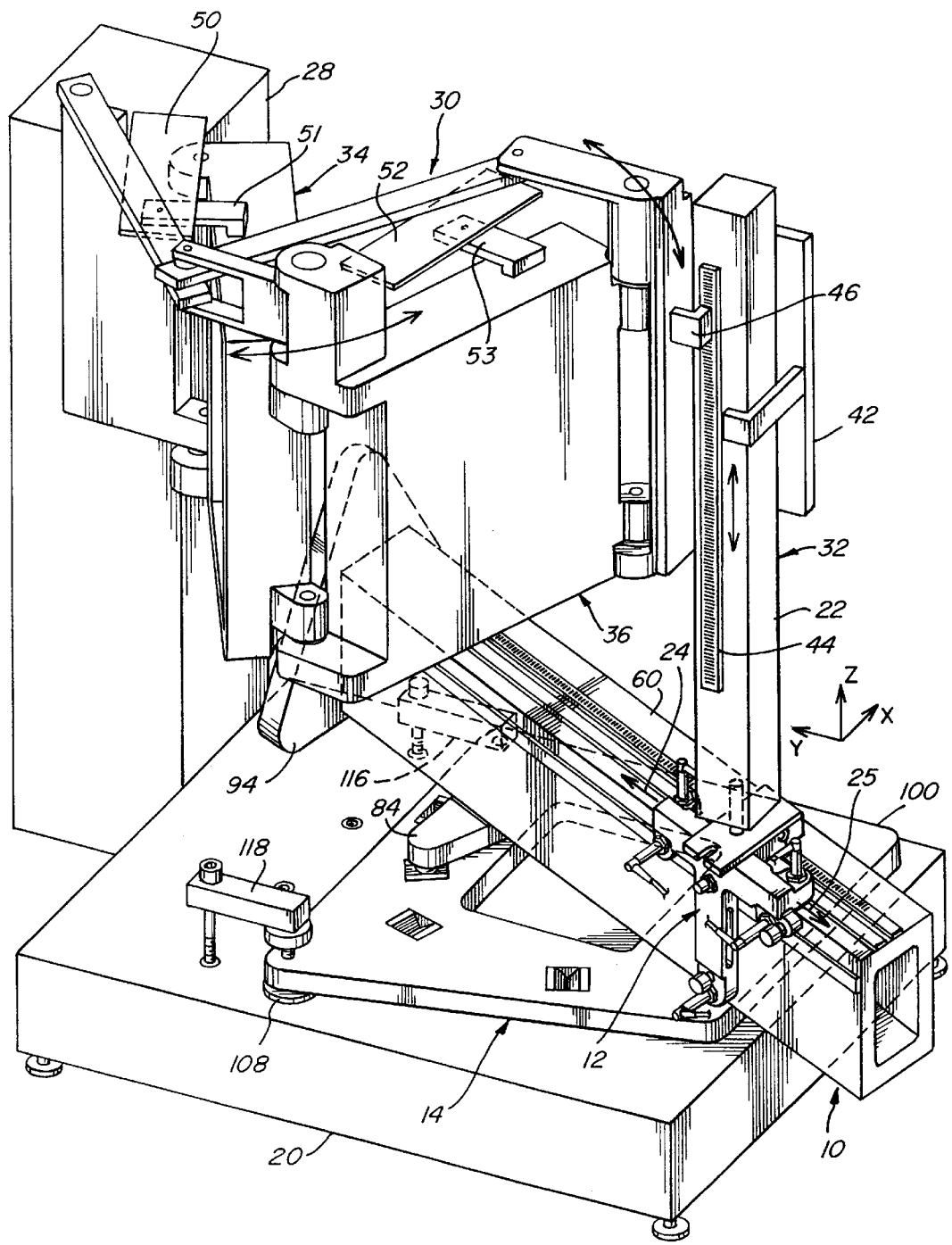
FIG. 1 is a perspective view of an embodiment of the calibration system of the present invention used with an articulated arm coordinate measuring machine.

An example of a calibration system in accordance with the present invention is shown in FIGS. 1–7. The calibration system is shown in FIG. 1 mounted on an articulated arm coordinate measuring machine. The calibration system includes a straightedge assembly 10, a sensing fixture 12 and a base plate assembly 14. In general, the base plate assembly 14 is mounted in a fixed position on a table 20 of the coordinate measuring machine (CMM), and the straightedge assembly 10 is mounted in a desired orientation on the base plate assembly 14. The base plate assembly 14 functions as a mounting fixture for mounting the straightedge assembly 10 to table 20 in different orientations. The sensing fixture 12 is attached to a movable Z-ram 22 of the coordinate measuring machine. In use, the sensing fixture 12 is moved with respect to the straightedge assembly 10 along a predetermined direction 24, 25 defined by the long dimension of the straightedge assembly, and position errors are measured as described below. It will be understood that the articulated arm coordinate measuring machine is shown by way of example only, and that the calibration system of the present invention can be used with different types of coordinate measuring machines.

The major components of the articulated arm coordinate measuring machine include table 20 for holding a workpiece (not shown) for measurement, a support structure 28, an articulated arm 30, and a Z-ram assembly 32. The coordinate measuring machine also includes a measuring assembly for determining coordinates as described below. The support structure 28 functions as a support for one end of the articulated arm 30 and is fixed in position relative to table 20. The articulated arm 30 is pivotally connected to support structure 28. More particularly, the articulated arm includes a first arm assembly 34 pivotally connected to the support structure 28 and a second arm assembly 36 pivotally connected to the first arm assembly. The first and second arm assemblies 34 and 36 pivot about vertical axes, so that Z-ram assembly 32 is movable in a horizontal plane.

The Z-ram assembly 32 is mounted to second arm assembly 36 and includes Z-ram 22, which is vertically movable with respect to a Z-ram housing 42. The Z-ram housing 42 is securely mounted to second arm assembly 36. A probe (not shown) may be removably attached to the Z-ram 22 during coordinate measurement of a workpiece. By vertical movement of Z-ram 22 with respect to Z-ram housing 42 and movement of articulated arm 30 in the horizontal plane, the Z-ram 22 (and the probe when attached) is movable within a three dimensional working volume of the coordinate measuring machine. The X, Y and Z directions are indicated in FIG. 1.

The measuring assembly determines the position of the probe in the working volume during coordinate measurement. In order to determine the position of the probe, it is necessary to determine the position of the articulated arm 30 in the horizontal plane, and the position of the probe relative to the Z-ram housing 42 in the vertical direction. The vertical position of the probe relative to the Z-ram housing 42 may be determined by a scale 44 affixed to the Z-ram 22 and a sensor 46 affixed to the articulated arm 30 or Z-ram housing 42. The position of the articulated arm 30 in the horizontal plane is determined by measuring the angle of the first arm assembly 34 relative to the support structure 28 with a first angle sensor and the angle of the second arm assembly 36 relative to the first arm assembly 34 with a second angle sensor. The first angle sensor may include a scale 50 and a read head 51 attached to movable elements of first arm assembly 34. The second angle sensor may include a scale 52 and a read head 53 attached to movable elements of second arm assembly 36. A preferred angle sensor is disclosed in U.S. Pat. No. 5,616,917, filed May 16, 1995, which is hereby incorporated by reference. Additional details regarding the articulated arm coordinate measuring machine are disclosed in pending application Ser. No. 08/441,972 filed May 16,1995, which is hereby incorporated by reference.

Straightedge assembly 10 includes straightedge 60 having an elongated, hollow rectangular shape. The straightedge 60 is preferably at least as long as the longest axis of the CMM to be calibrated plus the length of the sensing fixture 12. The straightedge 60 has precision surfaces that preferably are physically straight within one micrometer along its entire length. In particular, a top reference surface 62 and a side reference surface 64 of straightedge 60 meet the above straightness requirement along direction 24, 25 of sensing fixture 12. Top reference surface 62 is perpendicular to side reference surface 64, and both reference surfaces are parallel to direction 24, 25. The straightness requirement must be met along a measurement line 68 on top reference surface 62 and along spaced-apart measurement lines 70 and 72 on side reference surface 64. The measurement lines 68, 70 and 72 correspond to the positions of sensors on sensing fixture 12 as described below. In a preferred embodiment, the straightedge 60 is fabricated of a ceramic material and has a length of about 24 inches.

A glass scale 76 is attached to the top surface 62 of straightedge 60 parallel to measurement line 68. The scale 76 is read by a non-contact encoder on the sensing fixture 12 to measure displacement error along direction 24, 25. A magnetic strip 78 may be attached to top surface 62 parallel to measurement line 68, and a magnetic strip 80 may be attached to reference surface 64 parallel to measurement line 70. Each magnetic strip is preferably about 0.75 inch wide by 0.2 inch thick and may be steel. The magnetic strips 78 and 80 operate in conjunction with magnets in the sensing fixture 12 to provide a relatively constant preloading force between the sensing fixture 12 and the straightedge 60.

A locator plate 84 and a spacer 86 are affixed to the bottom surface of straightedge 60, typically by epoxy. Ceramic lapped spheres 88 and 89 are embedded in locator plate 84, and ceramic lapped sphere 90 is embedded in spacer 86. The spheres 88, 89 and 90 are positioned at the vertices of a triangle to engage corresponding grooves in base plate assembly 14 for horizontal alignment of the straightedge 60 along a desired calibration direction. A locator plate 94 having ceramic lapped spheres 95, 96 and 97 embedded therein is affixed to one end of straightedge 60. The spheres 95, 96 and 97 are positioned at the vertices of triangle to engage grooves in base plate assembly 14 for vertical alignment of straightedge 60. The straightedge 60, scale 76, magnetic strips 78 and 80, locator plates 84 and 94, spacer 86 and spheres 88, 89, 90, 95, 96, 97 constitute the straightedge assembly 10.

The base plate assembly 14 includes a rigid plate 100 that is sized according to the coordinate measuring machine being calibrated. The plate 100 is preferably supported by three support posts located at the vertices of an isosceles triangle. A support post 102 opposite the hypotenuse of the isosceles triangle has a fixed height, and adjustable support posts 104 and 106 include fine pitch leveling screws. Flat portions 108 of adjustable posts 104 and 106 are preferably gimbaled to ensure that they rest flat on table 20. As shown in FIG. 1, base plate assembly 14 is held in place by clamps 116 and 118 secured to threaded inserts in the table 20. Clamp 116 is secured to support post 102, and clamp 118 is secured to post 104.

Figure 8:
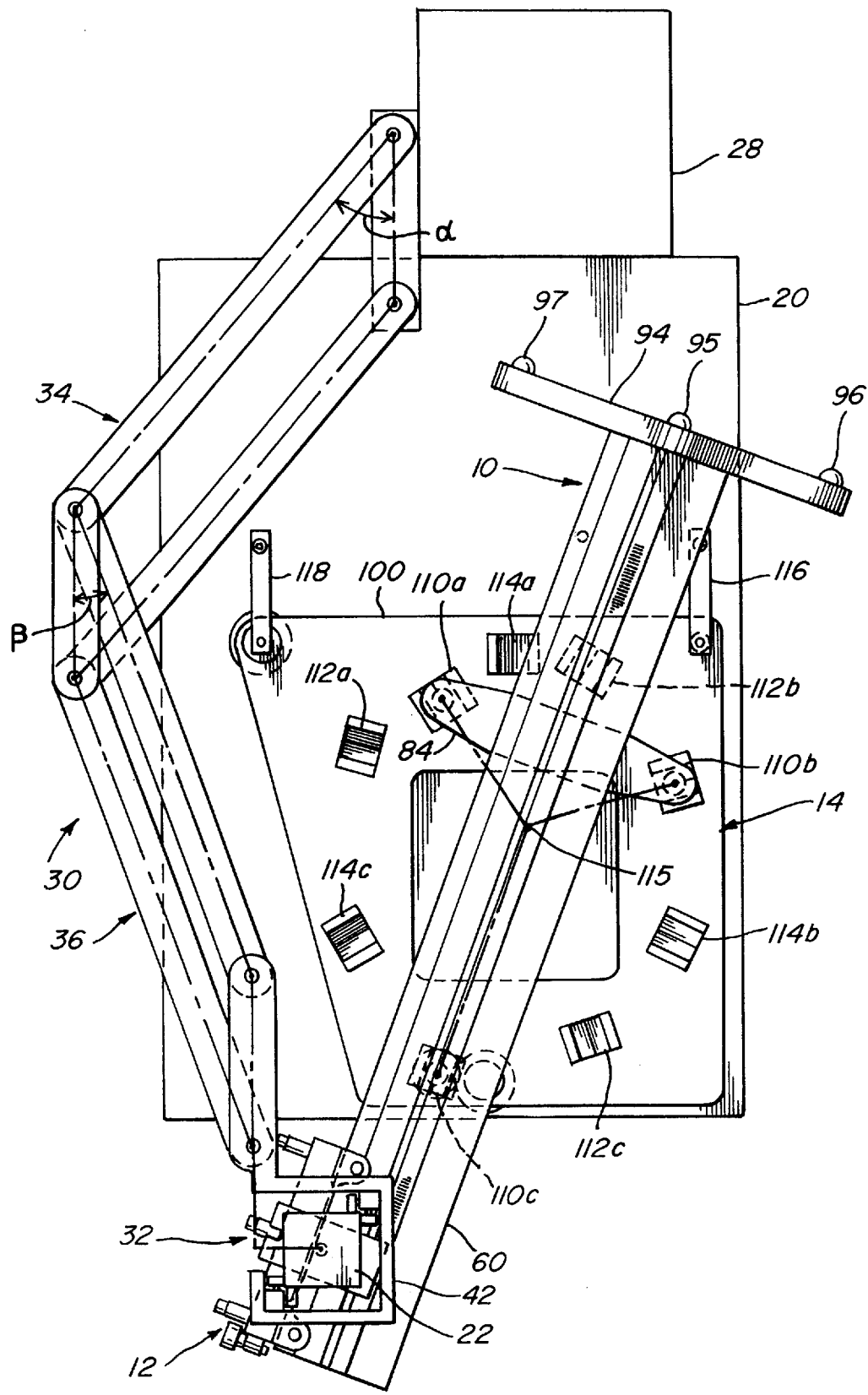
FIG. 8 is a somewhat schematic top plan view of the calibration system of the invention mounted on an articulated arm coordinate measuring machine, set up for testing angle $\beta$.
Figure 10:
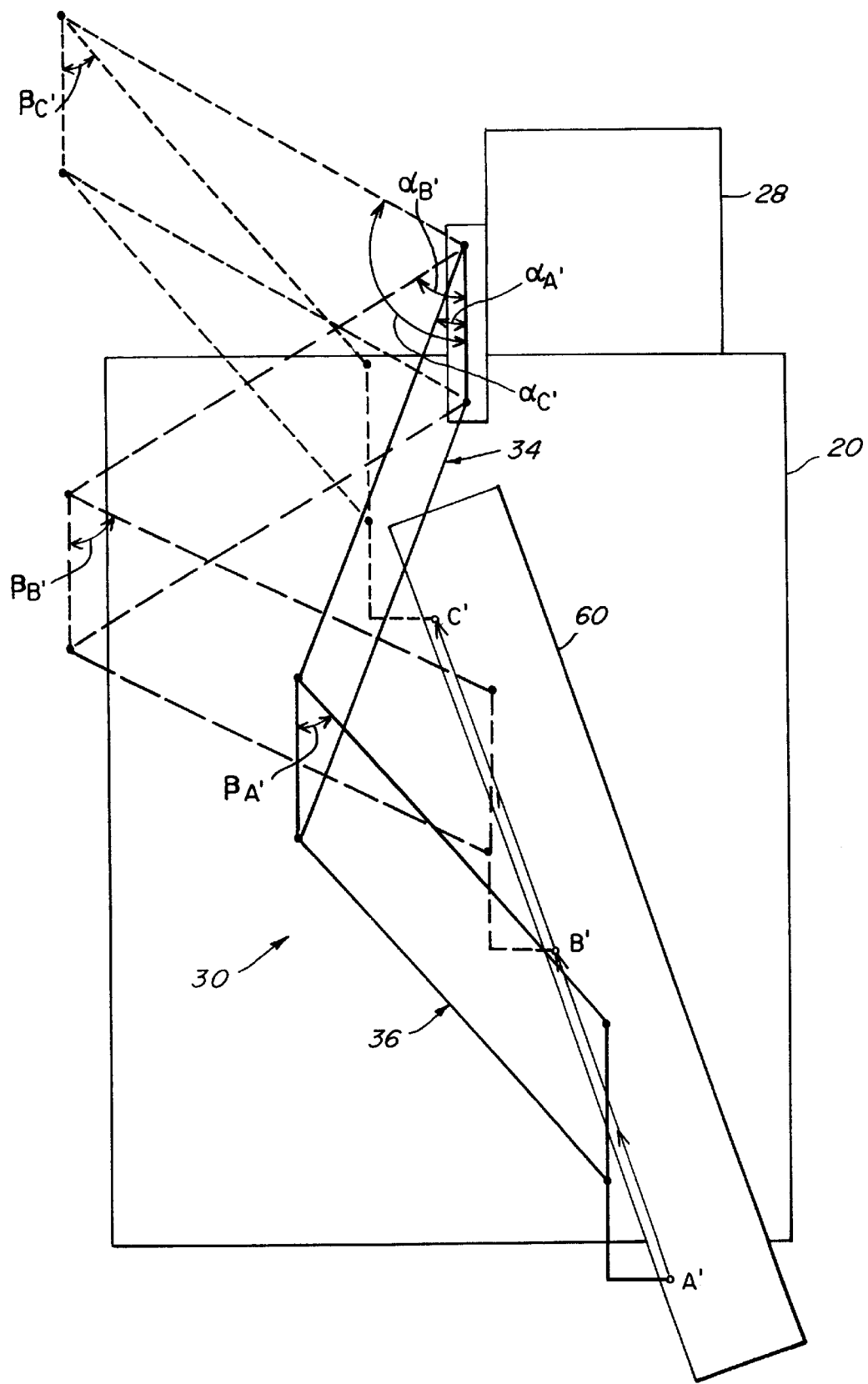
FIG. 10 is a schematic top plan view of the calibration system on an articulated arm coordinate measuring machine, set up for testing angle $\alpha$, showing the articulated arm in three different positions.
Figure 11:
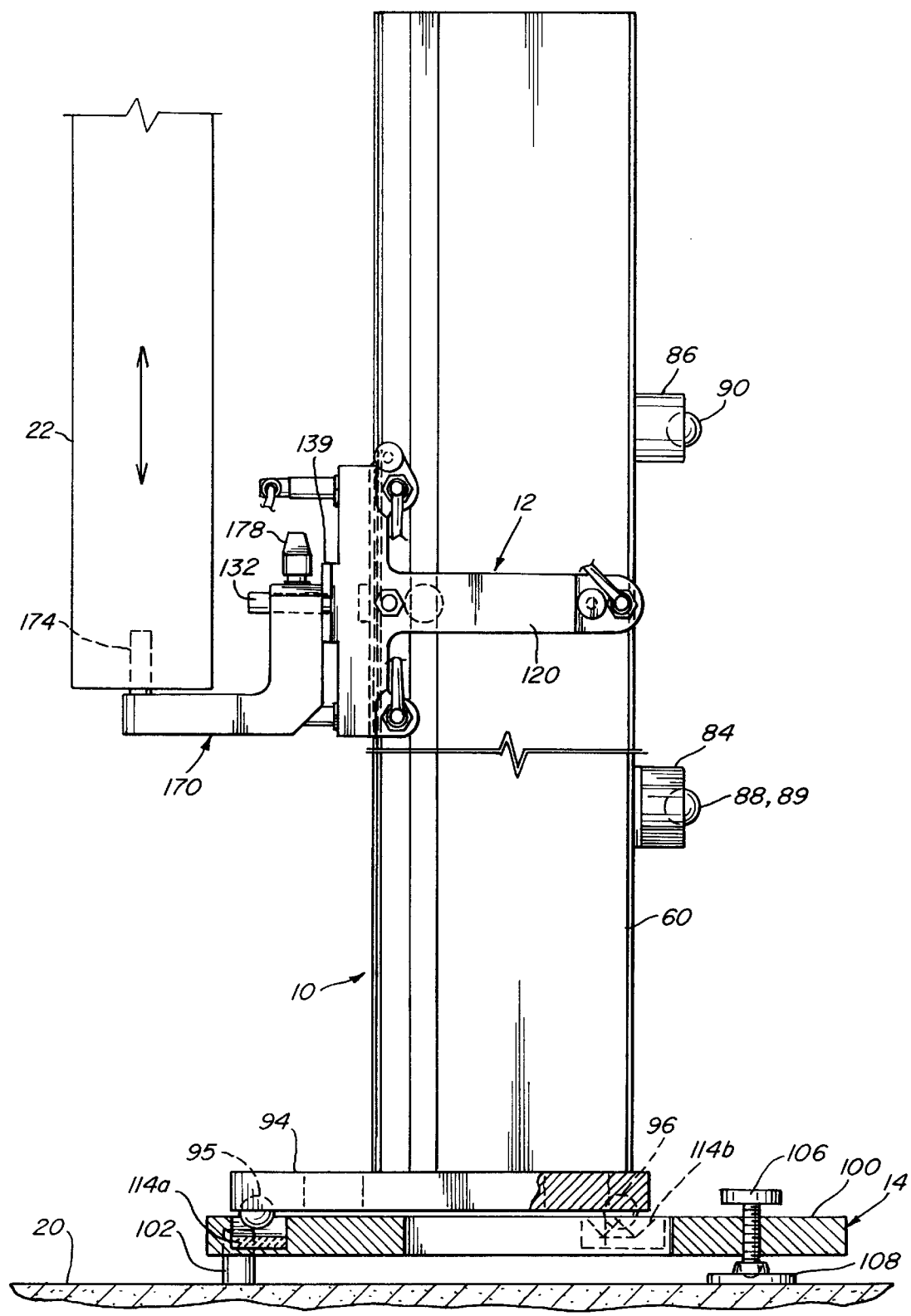
FIG. 11 is a partially broken-away side view of the calibration system set up for measuring position errors in the vertical direction.

The base plate assembly 14 is provided with sets of ceramic inserts which engage the locator spheres on the straightedge assembly. Each ceramic insert includes a lapped, V-shaped groove for engaging a corresponding sphere. Inserts 110*a*, 110*b* and 110*c* engage spheres 88, 89 and 90, respectively, in one horizontal orientation of the straightedge assembly 10 (FIG. 8). Inserts 112*a*, 112*b* and 112*c* engage spheres 88, 89 and 90, respectively, in a second horizontal orientation of the straightedge assembly 10 (FIG. 10). Inserts 114*a*, 114*b* and 114*c* engage spheres 95,96 and 97, respectively, in the vertical orientation of straightedge assembly 10 (FIG. 11). Preferably, the V-shaped grooves of each set of inserts are aligned such that their axes intersect at a central point 115, as shown in FIG. 8.

The sensing fixture 12 includes a housing 120 that engages the top and side reference surfaces 62 and 64 of straightedge 60. Sensors for sensing position errors of the Z-ram are mounted on housing 120. As shown in FIG. 1, the sensing fixture 12 attaches to the Z-ram 22 of the CMM in place of the measuring probe. The sensors on the sensing fixture include a read head for reading scale 76 and five linear variable differential transformers (LVDT's) for mechanically sensing the reference surfaces of straightedge 60.

As known in the art, an LVDT is a linear position transducer that includes a movable magnetic core, a primary winding and two secondary windings. An excitation signal is applied to the primary winding. The position of the magnetic core determines the voltage induced on each of the two secondary windings. When the core is approximately centered in the secondary windings, equal voltages are induced on each secondary winding. As the core is displaced from the center, the voltage induced on one secondary winding increases, while the voltage on the other secondary winding decreases. The two secondary windings are usually connected in series opposing, and the resulting difference voltage is measured. The phase relative to the primary voltage indicates the direction relative to the center position.

Figure 3:
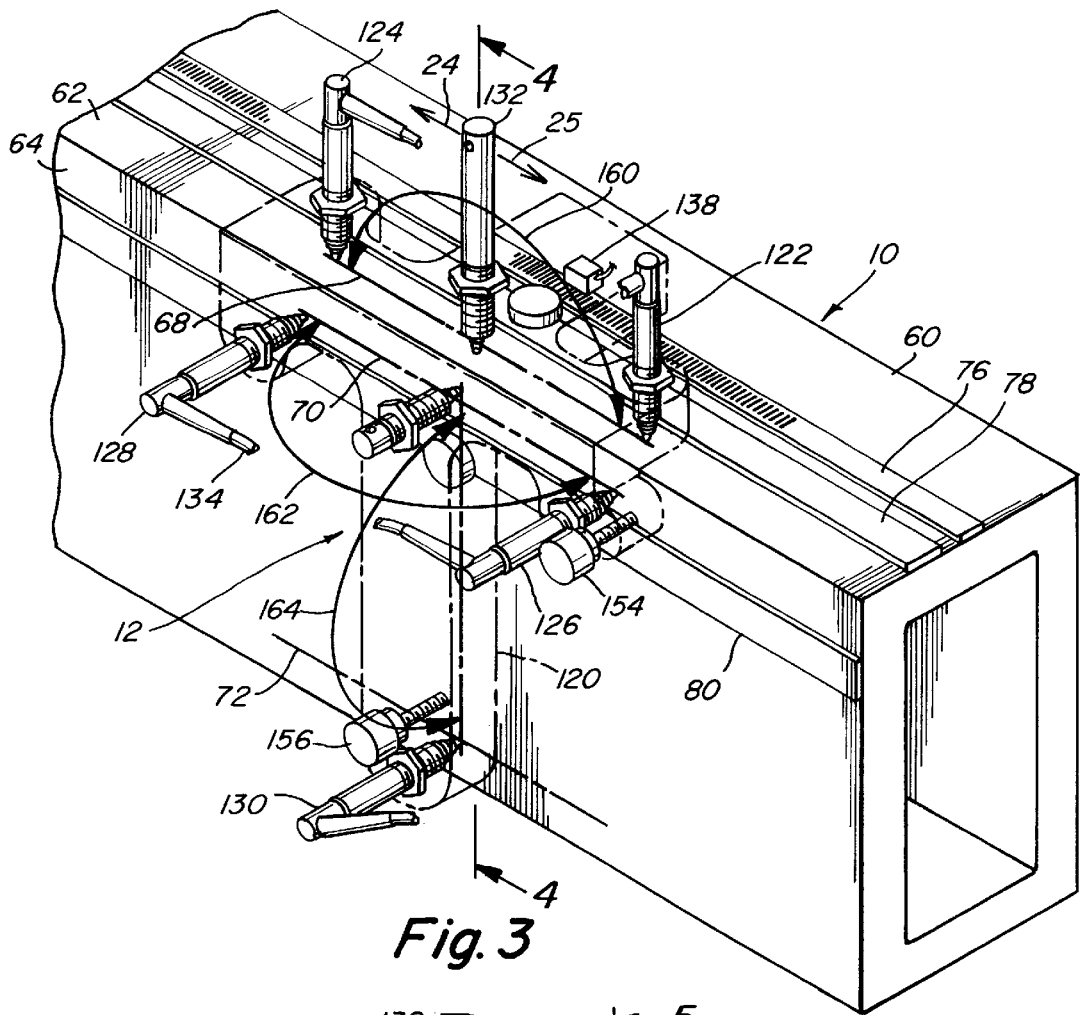
FIG. 3 is a fragmentary perspective view of the sensing fixture on the straightedge assembly, with the fixture housing represented by phantom lines.

As shown in FIG. 3, LVDT's 122, 124, 126, 128 and 130 are mounted in housing 120. Each of the LVDT's is mounted so that its movable core or a tip attached to the movable core contacts one of the precision surfaces of straightedge 60. Movement of sensing fixture 12 relative to the straightedge 60 having a component perpendicular to the reference surface contacted by the tip of the LVDT causes the movable core to be displaced relative to the coils of the LVDT, thereby generating a change in output voltage. In particular, LVDT's 122 and 124 are mounted in housing 120 such that their tips contact the top reference surface 62. LVDT's 122 and 124 are spaced apart on measurement line 68 and are symmetrically located with respect to a Z-ram attachment post 132. Similarly, LVDT's 126 and 128 are mounted in housing 120 such that their tips contact side reference surface 64 on measurement line 70. The LVDT's 126 and 128 are spaced apart and are positioned symmetrically on measurement line 70 with respect to Z-ram attachment post 132. LVDT 130 is mounted in housing 120 such that its tip contacts side reference surface 64 on measurement line 72. The LVDT 130 is spaced from LVDT's 126 and 128 in a direction perpendicular to direction 24, 25 and is vertically aligned with Z-ram attachment post 132. Each of the LVDT's is connected by wires 134 to a machine computer or other measuring circuit. A read head 138, typically an optical encoder, is mounted to a plate 139 attached to housing 120. The read head 138 senses scale 76.

Permanent magnets 140 and 142 may be mounted in housing 120 in alignment with magnetic strips 78 and 80, respectively. An adjustable point bearing 148 may be mounted in housing 120 so as to contact top reference surface 62, and an adjustable point bearing 150 may be mounted in housing 120 so as to contact side reference surface 64. The Z-ram attachment post 132 is preferably an extension of the point bearing 148. The magnets 140 and 142 urge the sensing fixture 12 against the top and side, respectively, of the straightedge 60, while the point bearings 148 and 150 maintain a desired spacing between the sensing fixture 12 and the top and side of the straightedge 60. The point bearings 148 and 150, magnets 140 and 142 and magnetic strips 78 and 80 function as a preloading mechanism which maintains the sensing fixture 12 at a fixed spacing from straightedge 60, but free to rotate, as the sensing fixture 12 is moved along straightedge 60. These elements are preferably installed when the calibration system is used to calibrate an articulated arm CMM. As discussed below, the elements of the preloading mechanism may be omitted when the calibration system is used to calibrate a moving bridge CMM.

A setup screw 154 is threaded into housing 120 adjacent to LVDT 126, and a setup screw 156 is threaded into housing 120 adjacent to LVDT 130. The setup screws 154 and 156 are used during adjustment and setup of the sensing fixture 12. During calibration of a CMM, the setup screws 154 and 156 are retracted and do not contact the straightedge 60.

Figure 4:
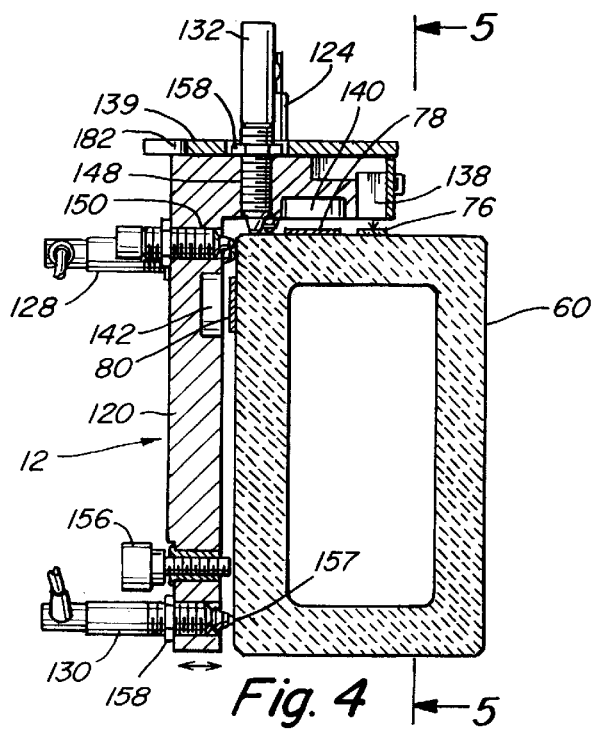
FIG. 4 is a cross-sectional side view of the sensing fixture and straightedge assembly, taken along the line 4—4 of FIG. 3.

As shown in FIG. 4, the housing 120 of sensing fixture 12 has a right angle configuration as viewed along direction 24, 25 so as to engage top reference surface 62 and side reference surface 64 of straightedge 60. The housing 120 provides a rigid mounting for each of the elements of the sensing fixture 12. Each of the LVDT's 122, 124, 126, 128 and 130 is threaded into housing 120 with its tip 157 in contact with the appropriate reference surface of straightedge 60. The tip 157 is affixed to or part of the movable core of the LVDT. Each of the LVDT'S includes a locking nut 158 which secures the LVDT to the housing 120 during a calibration procedure. During setup of the calibration system, the locking nut 158 may be loosened to permit adjustment of the LVDT. In a similar manner, point bearings 148, 150 are threaded into housing 120 and include locking nuts.

The sensors on the sensing fixture 12, including LVDT's 122, 124, 126, 128 and 130, and read head 138, are used to determine the six error parameters of the CMM along a desired calibration direction. Straightedge assembly 10 is mounted to the table 20 of CMM as described above, with straightedge 60 aligned with the desired calibration direction, and the sensing fixture 12 is mounted to the Z-ram 22. The sensing fixture 12 is moved along direction 24, 25 (the desired calibration direction), and sensor readings are recorded at a plurality of points.

Displacement errors are errors in the position of the Z-ram 22 along direction 24, 25. Vertical straightness errors are displacement errors of Z-ram 22 in a direction perpendicular to top reference surface 62. Horizontal straightness errors are displacement errors of Z-ram 22 in a direction perpendicular to side reference surface 64. Pitch errors are rotations of Z-ram 22 about an axis perpendicular to side reference surface 64, as indicated by arrow 160 in FIG. 3. Yaw errors are rotations of Z-ram 22 about an axis perpendicular to top reference surface 62, as indicated by arrow 162 in FIG. 3. Roll errors are rotations of Z-ram 22 about direction 24, 25 as indicated by arrow 164 in FIG. 3.

Figure 5:
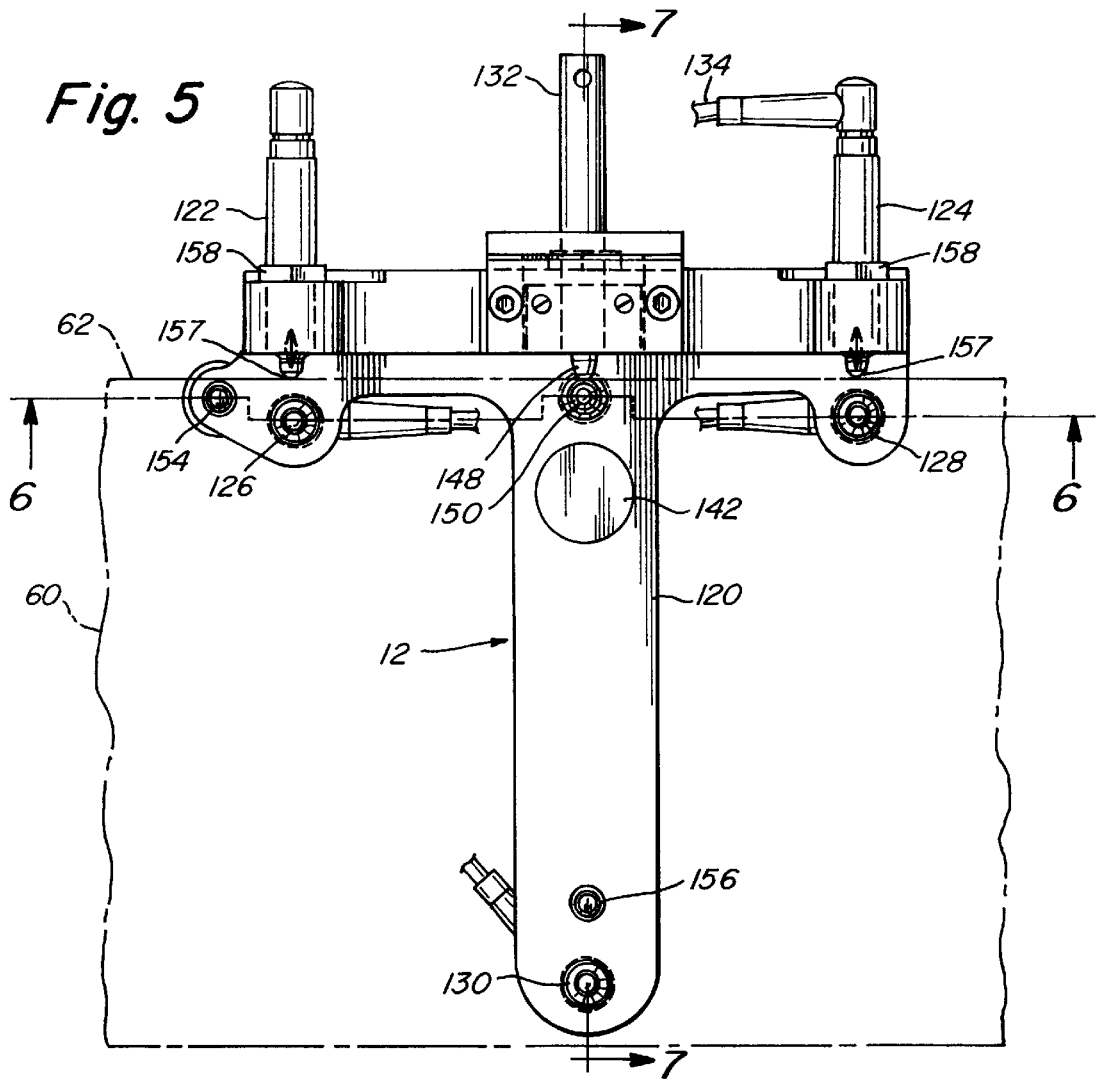
FIG. 5 is a rear elevational view of the sensing fixture as seen along line 5—5 of FIG. 4, with the straightedge assembly shown in phantom lines.

Pitch error measurement is illustrated in FIG. 5. As the sensing fixture 12 moves along straightedge 60, the tips of LVDT's 122 and 124 contact top reference surface 62. Pitch error causes the sensing fixture 12 to rotate in the direction indicated by arrow 160 in FIG. 3, thus causing a differential displacement of the cores of LVDT's 122 and 124. The pitch error is obtained by dividing the differential displacement of the cores of LVDT's 122 and 124 by the distance between them.

Figure 6:
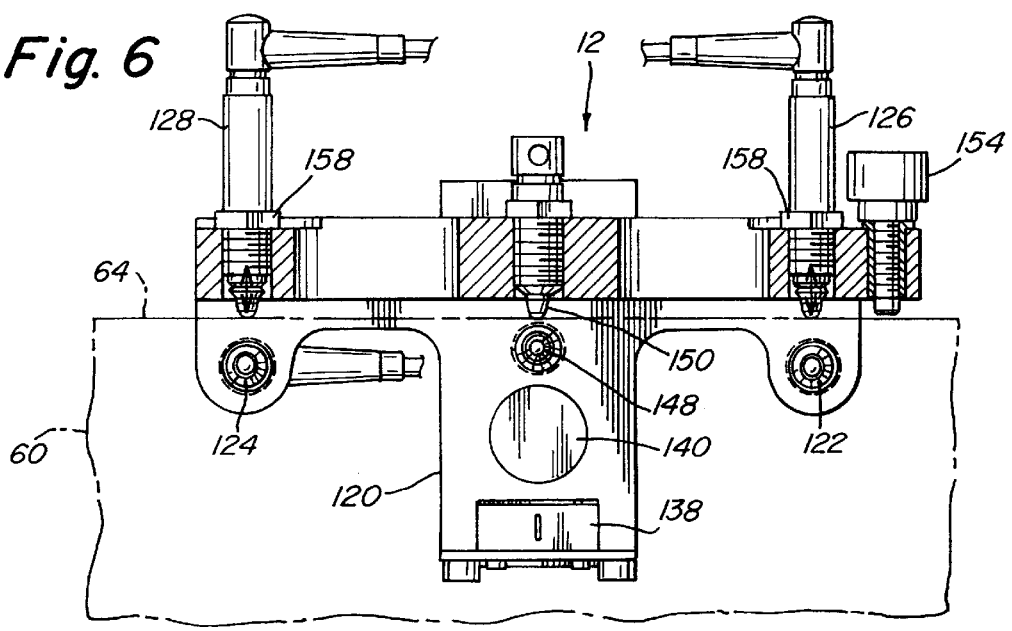
FIG. 6 is a cross-sectional bottom view of the sensing fixture, taken along the line 6—6 of FIG. 5, with the straightedge assembly shown in phantom lines.
Figure 7:
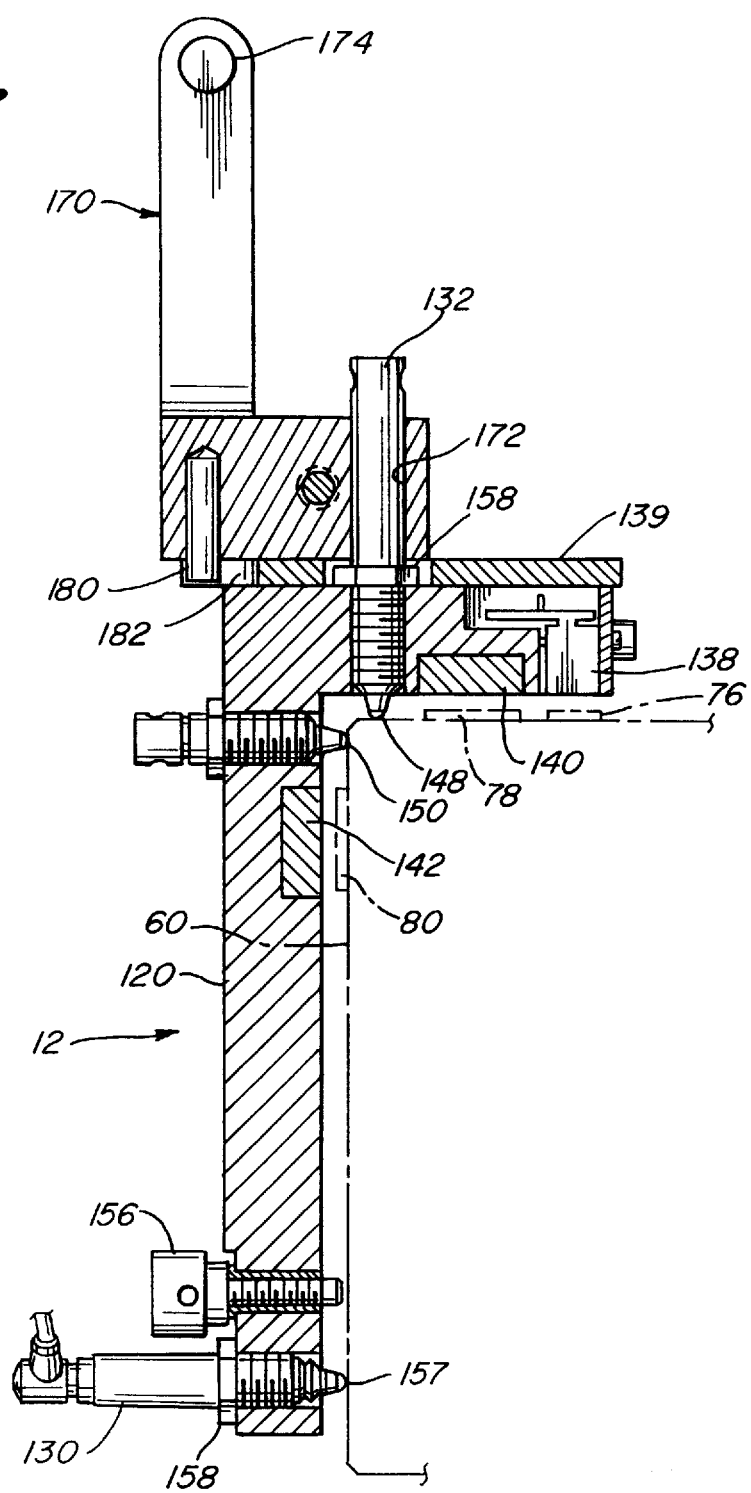
FIG. 7 is a cross-sectional side view of the sensing fixture, taken along line 7—7 of FIG. 5 shown with the adapter bracket in place.

Yaw error measurement is illustrated in FIG. 6. As the sensing fixture 12 moves along straightedge 60, the tips of LVDT's 126 and 128 contact side reference surface 64. Yaw errors cause the sensing fixture 12 to rotate in the direction indicated by arrow 162 in FIG. 3, thereby producing differential displacement of the cores of LVDT's 126 and 128. The yaw error is obtained by dividing the differential displacement of the cores of LVDT's 126 and 128 by the distance between them.

Roll error measurement is illustrated in FIG. 4. Roll error occurs when the sensing fixture 12 attached to the Z-ram of the CMM rotates in the direction indicated by arrow 164 in FIG. 3. Roll error causes a differential displacement of the cores of LVDT's 128 and 130. The roll error is obtained by dividing the difference between the displacement of the core of LVDT 130 and the average displacement of the cores of LVDT's 126 and 128 by the distance between measurement lines 70 and 72.

Displacement errors of Z-ram 22 along direction 24, 25 are determined from read head 138. The read head 138 reads lines on scale 76 which have a known spacing. Thus, the number of lines sensed is representative of displacement along direction 24, 25.

Vertical and horizontal straightness errors are determined in one of two ways, depending on whether the calibration system includes the preloading mechanism described above for maintaining the sensing fixture at a fixed spacing from straightedge 60. When the calibration system includes the preloading mechanism, including point bearings 148 and 150, magnets 140 and 142 and magnetic strips 78 and 80, straightness errors are determined by moving the sensing fixture along the straightedge 60 and recording the scale readings of the CMM at multiple points. Since the sensing fixture is forced to follow the precision surfaces of straightedge 60, it is known that the Z-ram 22 of the CMM has moved along a straight line. Deviations of the scale readings of the CMM from a straight line are therefore indicative of straightness errors. When the preloading mechanism is not installed in the calibration system, the sensing fixture 12 is not fixed relative to the straightedge 60, and any vertical straightness errors cause the cores of LVDT's 122 and 124 to be displaced perpendicular to reference surface 62. The output signal of either of LVDT's 122 and 124 is representative of vertical straightness errors. Similarly, any horizontal straightness errors cause the cores of LVDT's 126 and 128 to be displaced perpendicular to reference surface 64. The output signal of either of LVDT's 126 and 128 is representative of horizontal straightness errors. It will be understood that the two techniques described above for measuring vertical and horizontal straightness errors are equivalent. In each case, the movement of the CMM along a prescribed direction is compared with a precision straightedge.

The setup screws 154, 156 are used to lock the sensing fixture 12 in a fixed position relative to straightedge 60 for setup adjustments. One or both of the setup screws is advanced into contact with the straightedge 60. The LVDT's and/or the point bearings can then be adjusted. The point bearings 148 and 150 are adjusted to provide a desired spacing between the housing 120 and top reference surface 62 and side reference surface 64, respectively. The LVDT's are adjusted for desired output voltages. Preferably, the LVDT's 122 and 124 have equal output voltages for zero pitch error; LVDT's 126 and 128 have equal output voltages for zero roll error; and LVDT's 126, 128 and 130 have equal output voltages for zero roll error. The setup screws 154 and 156 are retracted from straightedge 60 during a calibration procedure.

The use of the calibration system of the present invention to calibrate an articulated arm coordinate measuring machine is illustrated in FIGS. 8–11. The straightedge assembly 10 is mounted to the table 20 of the CMM in different orientations using the base plate assembly 14, and error parameters are measured for each of the orientations. In the articulated arm coordinate measuring machine, horizontal orientations of the straightedge assembly 10 are selected to optimize measurement of errors of the articulated arm 30. As shown in FIG. 8, the position of first arm assembly 34 of articulated arm 30 with respect to support structure 28 is defined by an angle α, and the position of second arm assembly 36 with respect to first arm assembly 34 is defined by an angle β. In the example of the articulated arm CMM shown, each of the angles α and β has a range of about 20° to 120° associated with horizontal movement of the articulated arm.

Figure 9:
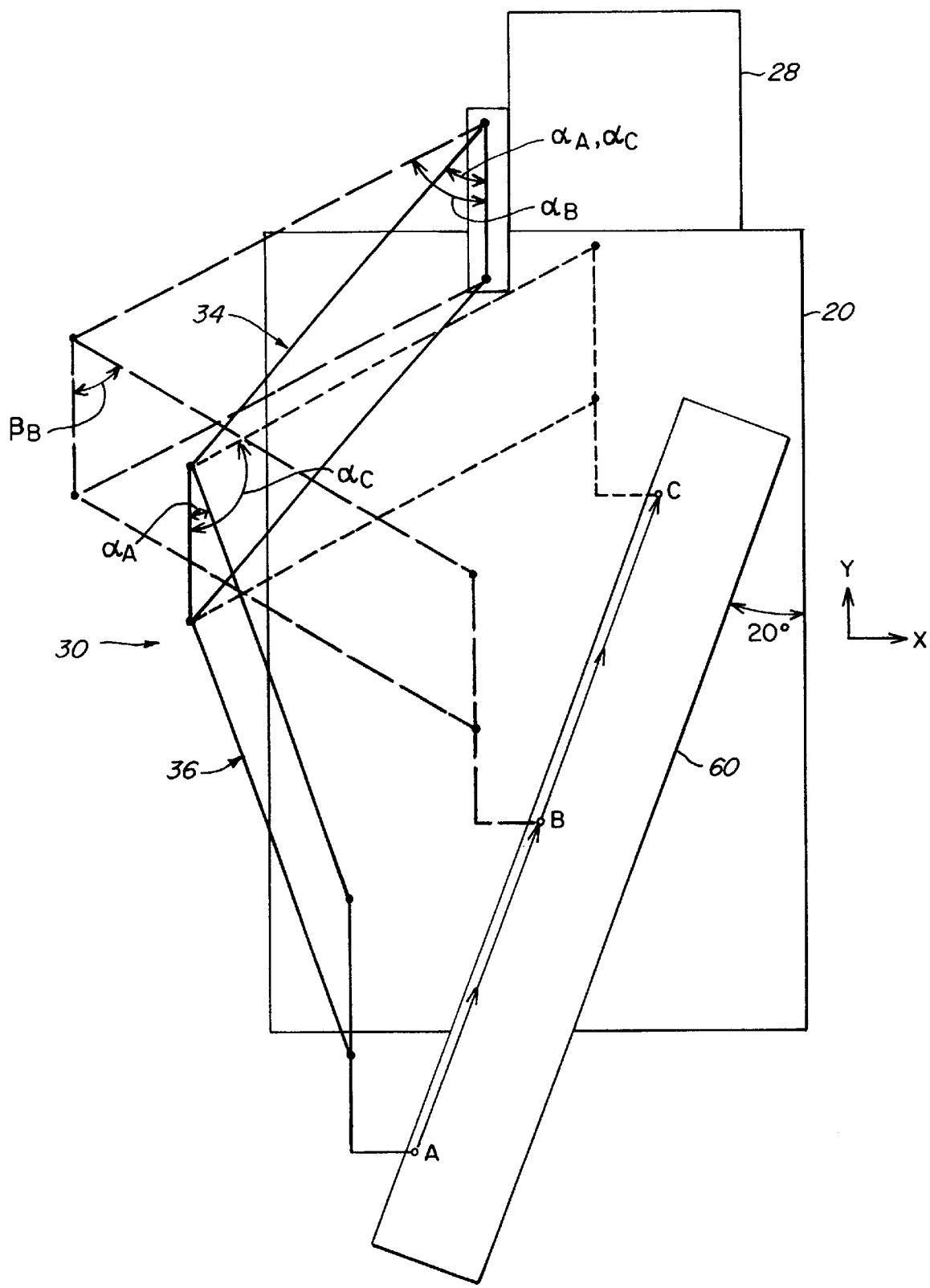
FIG. 9 is a schematic top plan view similar to FIG. 8, with the straightedge assembly set up for testing angle $\beta$, showing the articulated arm in three different positions.

A first horizontal orientation of straightedge assembly 10, shown in FIGS. 8 and 9, is selected to maximize variation of angle β and to minimize variation of angle α as the sensing fixture 12 moves along straightedge 60. In the orientation illustrated in FIGS. 8 and 9, the long dimension of straightedge 60 is oriented at an angle of about +20° with respect to the Y-axis of the CMM. During calibration, the sensing fixture 12 is attached to Z-ram 22. The articulated arm 30 carrying the sensing fixture 12 is moved such that the sensing fixture 12 moves along straightedge 60 from end to end, indicated by positions A, B and C in FIG. 9. As the sensing fixture 12 moves along straightedge 60, the readings of the sensing fixture sensors and the sensors of the CMM are recorded. In particular, the readings of LVDT's 122, 124, 126, 128 and 130, read head 138, sensor 46 (FIG. 1) and angle sensors 51 and 53 are recorded. These readings are used determine a matrix of error parameters. As shown in FIG. 9, angle β ranges from 20° when the sensing fixture is at point A, to 60° when the sensing fixture is at point B, to 120° when the sensing fixture is point C. Angle α ranges from 40° when the sensing fixture is at point A, to 65° when the sensing fixture is at point B, to 40° when the sensing fixture is at point C.

A preferred orientation of the straightedge assembly 10 for measurement of errors associated with angle a is shown in FIG. 10. The straightedge assembly 10 is mounted such that the long dimension of straightedge 60 is at an angle −20°, with respect to the Y-axis of the CMM. Another set of sensor readings are obtained as the sensing fixture is moved along the length of the straightedge 60 between by points A', B' and C'. In the orientation of FIG. 10, angle α ranges from 20° when the sensing fixture is at point A', to 60° when the sensing fixture is at point B', to 120° when the sensing fixture is at point C'. In this orientation, angle β ranges from 40° when the sensing fixture is at point A', to 65° when the sensing fixture is at point B', to 40° when the sensing fixture is at point C'.

Figure 2:
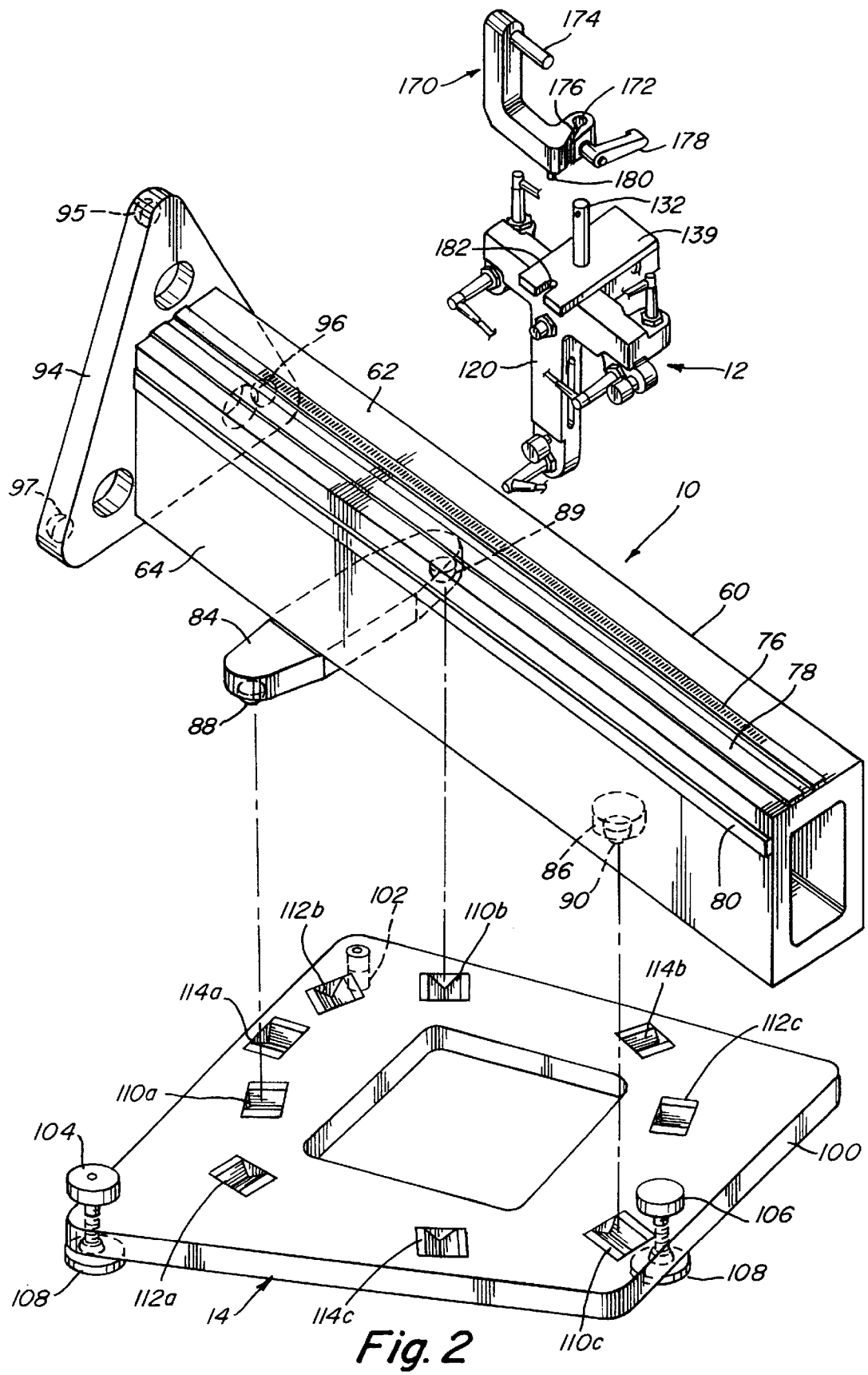
FIG. 2 is an exploded perspective view of the calibration system shown in FIG. 1.

The vertical orientation of the straightedge assembly 10 is shown in FIG. 11. The straightedge 60 is oriented vertically, and spheres 95, 96 and 97 are engaged in inserts 114a, 114b and 114c, respectively, of baseplate assembly 14. An adapter bracket 170 is used to attach the sensing fixture 12 to the Z-ram 22 in the vertical orientation. As shown in FIGS. 2 and 11, the adapter bracket 170 has a right angle configuration with a hole 172 at one end for receiving Z-ram attachment post 132 and a post 174 at the other end for attachment to Z-ram 22. An arrangement of a slot 176 that intersects hole 172 and a clamp 178 permits the adapter bracket 170 to be securely fastened to post 132 of sensing fixture 12. An alignment pin 180 on adapter bracket 170 fits into a slot 182 in plate 139 of the sensing fixture 12 to ensure proper alignment between adapter bracket 170 and sensing fixture 12.

During calibration, the Z-ram 22 is moved vertically, causing the sensing fixture 12 to move along straightedge 60. The sensors of the sensing fixture 12 and the sensors of the CMM provide readings at a plurality of points in the vertical direction. These readings are used to determine the six error parameters at each calibration point in the vertical direction.

Figure 12:
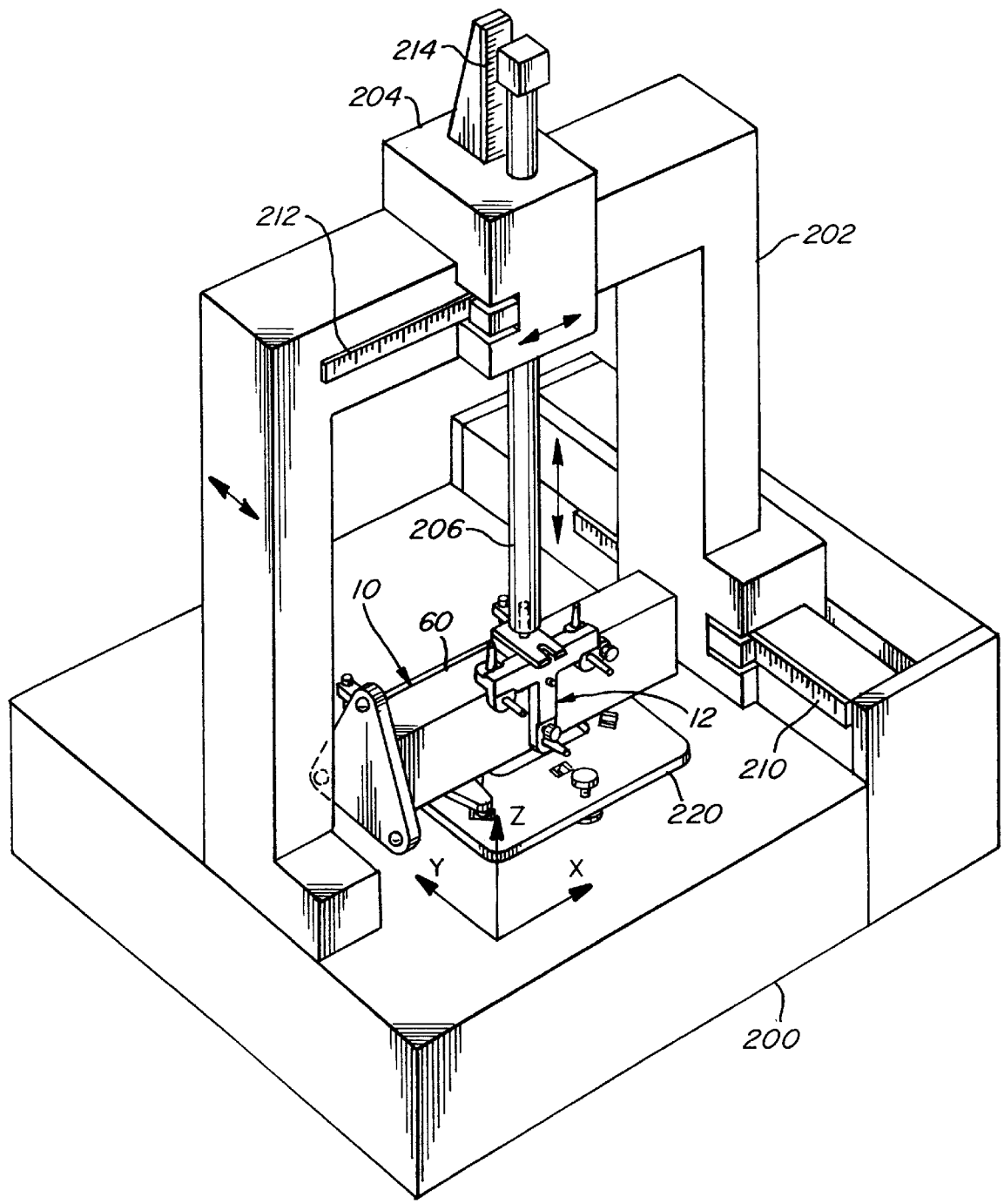
FIG. 12 is a schematic perspective view of the calibration system of the invention mounted on a moving bridge coordinate measuring machine, set up for X axis testing.
Figure 13:
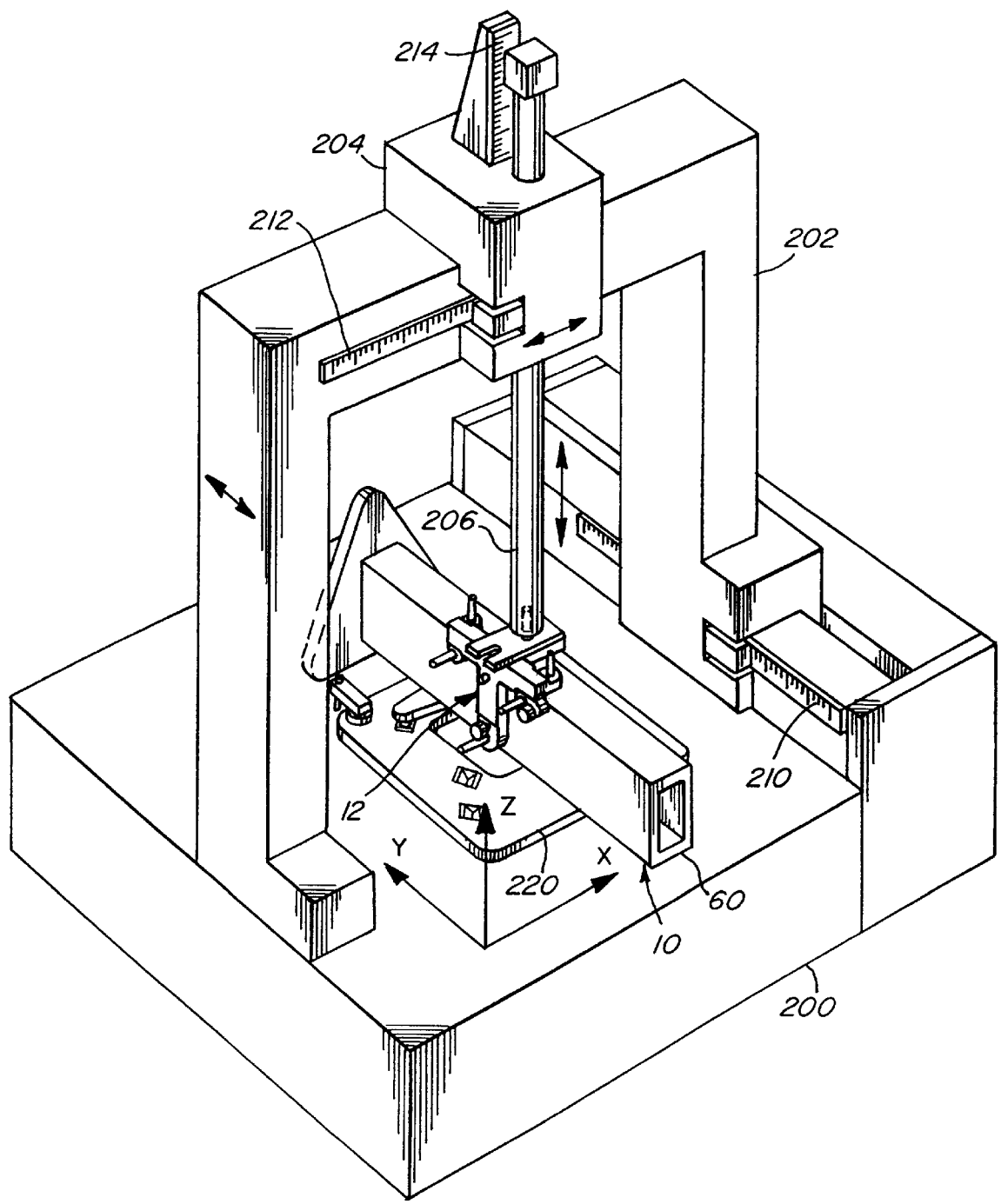
FIG. 13 is a schematic perspective view of the calibration system of the invention mounted on a moving bridge coordinate measuring machine, set up for Y axis testing.

The calibration system of the present invention is shown in FIGS. 12 and 13 mounted on a moving bridge coordinate measuring machine. The major components of the moving bridge coordinate measuring machine include a table 200 for holding a workpiece (not shown) for measurement, and a bridge 202 that moves in the Y direction along guideways on table 200. A carriage 204 moves in the X direction along guideways on the bridge 202. A Z-ram 206 moves vertically through bearings in the carriage 204. A probe (not shown) may be removably attached to the lower end of Z-ram 206 for measuring coordinates of the workpiece. A scale system 210 between bridge 202 and table 200, a scale system 212 between carriage 204 and bridge 202, and a scale system 214 between Z-ram 206 and carriage 204 indicate the Y, X and Z coordinates, respectively, of the movable elements in three axial directions. To measure the coordinates of a point on a workpiece, the probe is brought into contact with the point. The probe senses contact and causes a system computer (not shown in FIGS. 12 AND 13) to read and store the readings of the three scale systems.

In FIG. 12, the calibration system of the present invention is set up for X axis calibration. A base plate assembly 220 is mounted to table 200. The base plate assembly 220 is similar to the base plate assembly 14 shown in FIGS. 1–8 and described above, but has inserts positioned for aligning the straightedge assembly 10 with calibration orientations that are suitable for the moving bridge CMM. In a moving bridge CMM, the straightedge 60 is typically aligned with X, Y and Z directions for error measurements. In FIG. 12, the straightedge 60 is aligned with the X direction, and in FIG. 13 the straightedge 60 is aligned with the Y direction. The sensing fixture 12 is mounted to the Z-ram 206. For each orientation of the straightedge 60 and the sensing fixture 12, the sensing fixture is moved along the straightedge 60, and readings of LVDT's 122, 124, 126, 128 and 130, read head 138 and scale systems 210, 212 and 214 are recorded at a plurality of points. The scale readings are converted to parametric errors which are used to calibrate the coordinate measuring machine as described in the aforementioned Patent No. 4,884,889, which is hereby incorporated by reference. Z-axis measurements are made in the moving bridge CMM in the manner described above in connection with FIG. 11. That is, the straightedge 60 is mounted vertically on base plate assembly 220, and the sensing fixture is attached to the Z-ram 206 using the adapter bracket 170.

The moving bridge CMM typically permits selected axes of the machine to be locked. Thus, for example, when the calibration system is positioned for X-axis measurement as shown in FIG. 12, the Y and Z axes of the machine are locked. Thus, the Z-ram 206 and the sensing fixture 12 are constrained to move in the X direction along straightedge 60. The locking feature permits the preloading mechanism, including point bearings 148 and 150, magnets 140 and 142 and magnetic strips 78 and 80, to be omitted from the calibration system. In this configuration, the sensing fixture 12 is displaced relative to straightedge 60 in response to any straightness errors that may be present in the CMM. Accordingly, the reading of either LVDT 122 or LVDT 124 is representative of vertical straightness errors, and the reading of either LVDT 126 or LVDT 128 is representative of horizontal straightness errors. The displacements measured by LVDT's 122, 124, 126 and 128 can be translated to the position of the Z-ram 22 by removing the Abbe error caused by the known rotational errors. Alternatively, vertical and horizontal straightness errors can be measured in the moving bridge CMM in the manner described above in connection with the articulated arm CMM.

Figure 14:
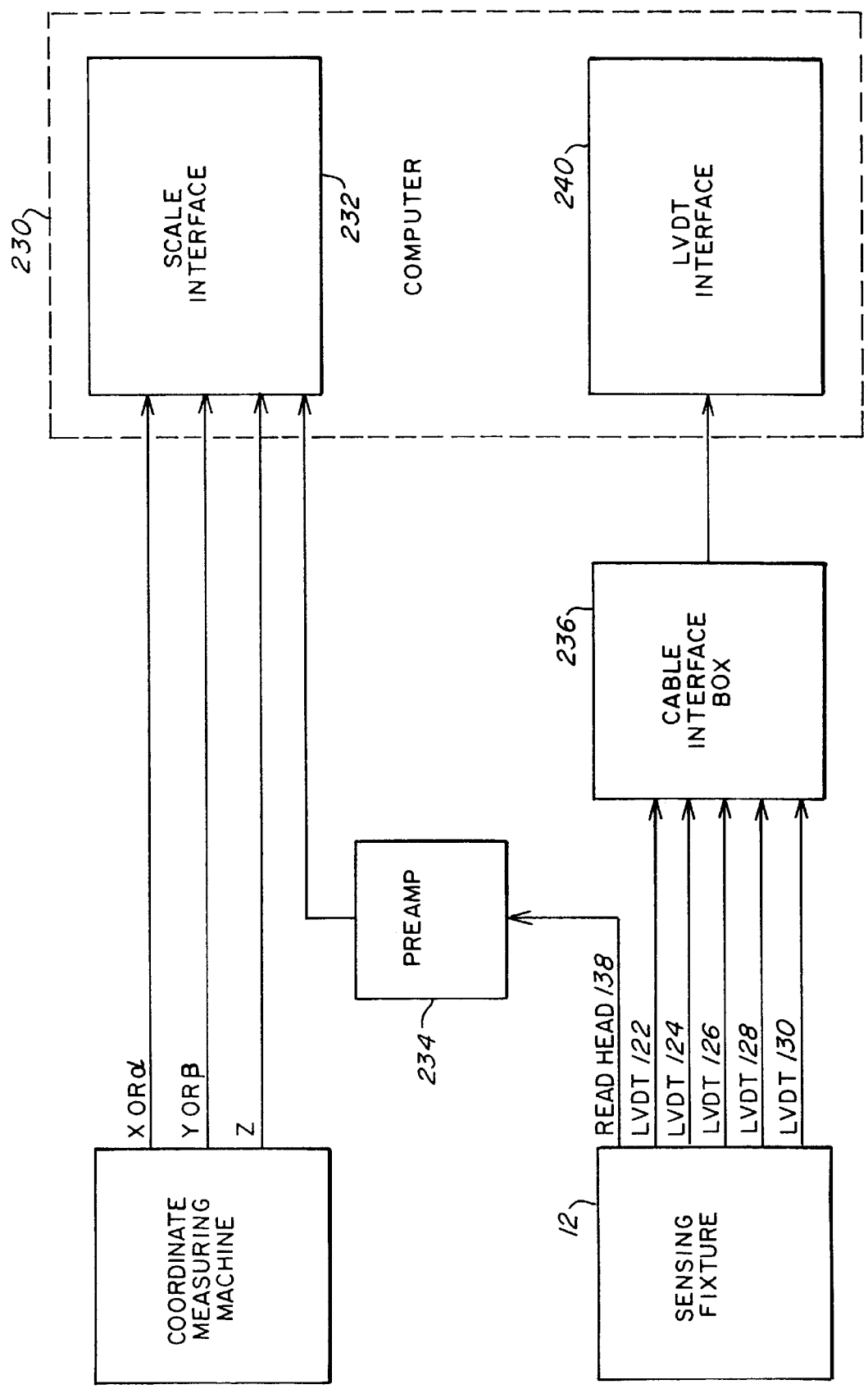
FIG. 14 is a block diagram of the circuitry associated with the calibration system.

A block diagram of the circuitry associated with the calibration system of the present invention is shown in FIG. 14. The CMM and the sensing fixture 12 provide sensor outputs to a computer 230. The outputs of the scale systems of the CMM are input to a scale interface circuit 232. The output of read head 138 in sensor fixture 12 is supplied through a preamp 234 to scale interface circuit 232. The outputs of LVDT's 122, 124, 126, 128 and 130 of sensing fixture 12 are connected through a cable interface box 236 to an LVDT interface circuit 240.

The scale interface circuit 232 converts each scale output to a digital representation and maintains position counters for each scale. The values in the position counters represent the coordinates along the measurement direction. The LVDT interface circuit 240 accepts the output signal from each LVDT, demodulates the signals and amplifies the demodulated signals. The circuit then performs an analog-to-digital conversion of each LVDT signal. Resulting digital values are converted to millimeters and are stored in a data array.

It will be understood that the calibration system shown and described herein can be used to calibrate any coordinate measuring machine. In a CMM that has X, Y and Z axes, the straightedge 60 is typically aligned with each machine axis, and calibration measurements are obtained. However, the straightedge 60 can be positioned at an angle with respect to the machine axis if desired. Furthermore, the calibration system can be used to calibrate an articulated arm coordinate measuring machine as shown and described.

The sensing fixture 12 has been described as utilizing LVDT's for sensing position errors. However, other types of position sensors may be utilized within the scope of the present invention. For example, capacitance gauges may be utilized. As known in the art, capacitance varies with the spacing between the plates of a capacitor. In this configuration, the reference surfaces of the straightedge 60 must be conductive. In general, any sensor capable of sensing displacement between the sensing fixture and the straightedge may be utilized.

While there have been shown and described what are at present considered the preferred embodiments of the present invention, it will be obvious to those skilled in the art that various changes and modifications may be made therein without departing from the scope of the invention as defined by the appended claims.

What is claimed is:

1. Apparatus for measuring position errors in a machine having a movable element and a fixed table, said apparatus comprising:

a straightedge assembly attachable to said table, said straightedge assembly including a straightedge;

a sensing fixture attachable to said movable element, said sensing fixture including a fixture housing and sensors on the housing for sensing the position of said movable element relative to said straightedge and for generating position error signals representative of position errors of said movable element as said sensing fixture is moved in a predetermined direction along said straightedge; and a mounting fixture for mounting said straightedge assembly to said table in different orientations to permit measurement of position errors along different predetermined directions.

2. Apparatus as defined in claim 1 wherein said straightedge includes a first reference surface that is parallel to said predetermined direction, and said sensors include a first sensor for sensing a position of said movable element relative to said first reference surface in a direction perpendicular to said first reference surface, said first sensor providing position error signals representative of displacement errors of said movable element perpendicular to said first reference surface.

3. Apparatus as defined in claim 2 wherein said sensors further include a second sensor spaced from said first sensor along said predetermined direction for sensing the position of said movable element relative to said first reference surface in the direction perpendicular to said first reference surface, whereby the position error signals provided by said first and second sensors represent pitch errors of said movable element along said predetermined direction.

4. Apparatus as defined in claim 3 wherein said straightedge further includes a second reference surface perpendicular to said first reference surface and parallel to said predetermined direction, and said sensors further include a third sensor for sensing a position of said movable element in a direction perpendicular to said second reference surface, said third sensor providing position error signals representative of displacement errors of said movable element perpendicular to said second reference surface.

5. Apparatus as defined in claim 4 wherein said sensors further include a fourth sensor spaced from said third sensor along said predetermined direction for sensing the position of said movable element relative to said second reference surface in the direction perpendicular to said second reference surface, whereby the position error signals provided by said third and fourth sensors represent yaw errors of said movable element along said predetermined direction.

6. Apparatus as defined in claim 5 wherein said sensors further include a fifth sensor spaced from said third and fourth sensors perpendicular to said predetermined direction for sensing the position of said movable element relative to said second reference surface in the direction perpendicular to said second reference surface, whereby the position error signals provided by said third, fourth and fifth sensors represent roll errors of said movable element along said predetermined direction.

7. Apparatus as defined in claim 6 wherein said straightedge assembly further includes a scale disposed parallel to said predetermined direction, and said sensors further include a read head for sensing said scale and generating position error signals representative of displacement errors of said movable element along said predetermined direction.

8. Apparatus as defined in claim 6 wherein said first, second, third, fourth and fifth sensors comprise sensors for mechanically sensing said first and second reference surfaces.

9. Apparatus as defined in claim 6 wherein said first, second, third, fourth and fifth sensors comprise linear variable differential transformers.

10. Apparatus as defined in claim 1 wherein said straightedge includes a first reference surface that is parallel to said predetermined direction and a second reference surface perpendicular to said first reference surface and parallel to said predetermined direction, and said sensors include a plurality of sensors for providing position error signals representative of displacement, pitch, yaw and roll errors of said movable element along said predetermined direction.

11. Apparatus as defined in claim 10 wherein said first and second reference surfaces comprise a ceramic material.

12. Apparatus as defined in claim 10 further including a preloading device constructed and arranged to preload said sensing fixture against said straightedge.

13. Apparatus as defined in claim 12 wherein said preloading device comprises said straightedge assembly including first and second magnetic strips parallel to said first and second reference surfaces, respectively, and said sensing fixture including one or more magnetic elements attached to said fixture housing for urging said sensing fixture toward said magnetic strips and two or more point bearings attached to said fixture housing for maintaining a desired spacing between said fixture housing and said straightedge.

14. Apparatus as defined in claim 1 wherein said mounting fixture permits said straightedge assembly to be mounted in three mutually different orientations.

15. Apparatus as defined in claim 1 wherein said mounting fixture comprises a base plate for mounting in a fixed position on said table, said base plate having two or more sets of locating grooves, one set corresponding to each of said orientations, said straightedge assembly having locating elements for engaging said locating grooves in each of said orientations.

16. Apparatus as defined in claim 1 wherein said sensing fixture includes apparatus constructed and arranged to attach said sensing fixture to said movable element in each of said orientations.

17. Apparatus as defined in claim 1 wherein said machine comprises a coordinate measuring machine.

18. Apparatus as defined in claim 17 wherein said coordinate measuring machine comprises an articulated arm pivotally attached at one end to a support post for movement in a horizontal plane and a Z-ram attached to the other end of said articulated arm and vertically movable with respect to said articulated arm.

19. Apparatus as defined in claim 17 wherein said coordinate measuring machine comprises a moving bridge coordinate measuring machine.

20. Apparatus as defined in claim 1 wherein said straightedge includes a first reference surface that is parallel to said predetermined direction and a second reference surface perpendicular to said first reference surface and parallel to said predetermined direction, and said sensors include a first sensor for sensing a position of said movable element relative to said first reference surface in a direction perpendicular to said first reference surface, and a second sensor spaced from said first sensor along said predetermined direction for sensing the position of said movable element relative to said first reference surface in the direction perpendicular to said first reference surface, whereby the position error signals provided by said first and second sensors represent pitch errors of said movable element along said predetermined direction.

21. Apparatus as defined in claim 20 wherein said sensors further include a third sensor for sensing a position of said movable element in a direction perpendicular to said second reference surface, and a fourth sensor spaced from said third sensor along said predetermined direction for sensing the position of said movable element relative to said second reference surface in the direction perpendicular to said second reference surface, whereby the position error signals provided by said third and fourth sensors represent yaw errors of said movable element along said predetermined direction.

22. Apparatus as defined in claim 21 wherein said sensors further include a fifth sensor spaced from said third and fourth sensors perpendicular to said predetermined direction for sensing the position of said movable element relative to said second reference surface in the direction perpendicular to said second reference surface, whereby the position error signals provided by said third, fourth and fifth sensors represent roll errors of said movable element along said predetermined direction.

23. A calibration system for measuring position errors in a coordinate measuring machine having a fixed table and a movable element that is movable in three dimensions relative to said table, said calibration system comprising:

a straightedge assembly attachable to said table, said straightedge assembly including a straightedge having a first reference surface that is parallel to a predetermined direction and a second reference surface perpendicular to said first reference surface and parallel to said predetermined direction;

a sensing fixture attachable to said movable element, said sensing fixture including a fixture housing and sensors on said housing for sensing the position of said movable element relative to said first and second reference surfaces and generating position error signals representative of position errors of said movable element as said sensing fixture is moved in said predetermined direction along said first and second reference surfaces; and a mounting fixture for mounting said straightedge assembly to said table in different orientations to permit measurement of position errors along different directions.

24. A calibration system as defined in claim 23 wherein said sensors comprise first, second, third, fourth and fifth linear variable differential transformers for providing position error signals representative of pitch, yaw and roll errors of said movable element along said predetermined direction.

25. A calibration stem as defined in claim 24 wherein said straightedge assembly further includes a scale disposed parallel to said predetermined direction, and said sensors further include a read head for sensing said scale and generating position error signals representative of displacement errors of said movable element along said predetermined direction.

26. A calibration system as defined in claim 24 further including means for preloading said sensing fixture with respect to said first and second reference surfaces of said straightedge.

27. Apparatus for measuring position errors in a coordinate measuring machine having a movable element, a fixed table and an articulated arm pivotally attached at one end to a support post for movement in a horizontal plane and a Z-ram attached to the other end of said articulated arm and vertically moveable with respect to said articulated arm, said apparatus comprising:

a straightedge assembly attachable to said table, said straightedge assembly including a straightedge; and a sensing fixture attachable to said movable element, said sensing fixture including a fixture housing and sensors on the housing for sensing the position of said movable element relative to said straightedge and for generating position error signals representative of position errors of said movable element as said sensing fixture is moved in a predetermined direction along said straightedge.

28. Apparatus as defined in claim 27 wherein said straightedge includes a first reference surface that is parallel to said predetermined direction and a second reference surface perpendicular to said first reference surface and parallel to said predetermined direction, and said sensors include a first sensor for sensing a position of said movable element relative to said first reference surface in a direction perpendicular to said first reference surface, and a second sensor spaced from said first sensor along said predetermined direction for sensing the position of said movable element relative to said first reference surface in the direction perpendicular to said first reference surface, whereby the position error signals provided by said first and second sensors represent pitch errors of said movable element along said predetermined direction.

29. Apparatus as defined in claim 28 wherein said sensors further include a third sensor for sensing a position of said movable element in a direction perpendicular to said second reference surface, and a fourth sensor spaced from said third sensor along said predetermined direction for sensing the position of said movable element relative to said second reference surface in the direction perpendicular to said second reference surface, whereby the position error signals provided by said third and fourth sensors represent yaw errors of said movable element along said predetermined direction.

30. Apparatus as defined in claim 29 wherein said sensors further include a fifth sensor spaced from said third and fourth sensors perpendicular to said predetermined direction for sensing the position of said movable element relative to said second reference surface in the direction perpendicular to said second reference surface, whereby the position error signals.

31. Apparatus as defined in claim 27 further including a mounting fixture for mounting said straightedge assembly to said table in different orientations to permit measurement of position errors along different predetermined directions.

32. Apparatus as defined in claim 31 wherein said mounting fixture permits said straightedge assembly to be mounted in three mutually different orientations.

33. Apparatus as defined in claim 31 wherein said mounting fixture comprises a base plate for mounting in a fixed position on said table, said base plate having two or more sets of locating grooves, one set corresponding to each of said orientations, said straightedge assembly having locating elements for engaging said locating grooves in each of said orientations.

34. Apparatus as defined in claim 31 wherein said sensing fixture includes apparatus constructed and arranged to attach said sensing fixture to said movable element in each of said orientations.

35. Apparatus as defined in claim 27 wherein said straightedge includes a first reference surface that is parallel to said predetermined direction and a second reference surface perpendicular to said first reference surface and parallel to said predetermined direction, and said sensors include a plurality of sensors for providing position error signals representative of displacement, pitch, yaw and roll errors of said movable element along said predetermined direction.

36. Apparatus as defined in claim 35 wherein said first and second reference surfaces comprise a ceramic material.

37. Apparatus as defined in claim 35 further including a preloading device constructed and arranged to preload said sensing fixture against said straightedge.

38. Apparatus as defined in claim 37 wherein said preloading device comprises said straightedge assembly including first and second magnetic strips parallel to said first and second reference surfaces, respectively, and said sensing fixture including one or more magnetic elements attached to said fixture housing for urging said sensing fixture toward said magnetic strips and two or more point bearings attached to said fixture housing for maintaining a desired spacing between said fixture housing and said straightedge.

* * * * *